(12) United States Patent
Sugiyama et al.

(10) Patent No.: US 9,362,706 B2
(45) Date of Patent: Jun. 7, 2016

(54) LASER MACHINE AND CONTROLLING METHOD OF LASER MACHINE

(75) Inventors: Akihiko Sugiyama, Kanagawa (JP); Yoshinao Miyamoto, Kanagawa (JP); Takahiro Mori, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 6 days.

(21) Appl. No.: 13/816,614

(22) PCT Filed: Sep. 5, 2011

(86) PCT No.: PCT/JP2011/070136
§ 371 (c)(1),
(2), (4) Date: Feb. 12, 2013

(87) PCT Pub. No.: WO2012/036008
PCT Pub. Date: Mar. 22, 2012

(65) Prior Publication Data
US 2013/0170514 A1    Jul. 4, 2013

(30) Foreign Application Priority Data

Sep. 14, 2010 (JP) ................. 2010-205446

(51) Int. Cl.
*H01S 3/041*    (2006.01)
*H01S 3/00*     (2006.01)
(Continued)

(52) U.S. Cl.
CPC .............. *H01S 3/041* (2013.01); *H01S 3/0014* (2013.01); *H01S 3/0407* (2013.01); *H01S 3/097* (2013.01); *H01S 3/2232* (2013.01)

(58) Field of Classification Search
CPC .............................. H01S 3/041; H01S 3/0014
USPC ................. 372/34, 35, 55, 56, 57, 58, 59, 60
See application file for complete search history.

(56) References Cited

U.S. PATENT DOCUMENTS 4,430,739 A * 2/1984 McMahan .................. 372/38.05
6,034,978 A   3/2000 Ujazdowski et al.
(Continued)

FOREIGN PATENT DOCUMENTS

DE    102004040582 A1 * 2/2006 ............. B23K 26/00
EP         1580852          9/2005
(Continued)

OTHER PUBLICATIONS

Martin, "Shutting Down the Zeiss Confocal," 2005, Keck Imaging Center, University of Washington, http://depts.washington.edu/keck/Zeiss/Shutting%20down%20ther%20Zeiss%20Confocal%20System.html, 1-4.*

(Continued)

*Primary Examiner* — Joshua King
(74) *Attorney, Agent, or Firm* — Greenblum & Bernstein, P.L.C.

(57) ABSTRACT

A laser machine includes a laser oscillator, a cooler for cooling the laser oscillator, and a control unit for controlling the laser oscillator and the cooler. The control unit includes a controller that stops base discharge of the laser oscillator at a time when a specified time has elapsed from a stop of laser light emission by the laser oscillator. According to the laser machine, since base discharge of the laser oscillator is stopped after the specified time has elapsed from the stop of laser light emission, wasteful energy (power) consumption of the laser oscillator in a standby state can be restricted.

10 Claims, 7 Drawing Sheets

(51) Int. Cl.
　　　*H01S 3/097*　　(2006.01)
　　　*H01S 3/04*　　(2006.01)
　　　*H01S 3/223*　　(2006.01)

(56) References Cited

U.S. PATENT DOCUMENTS

| | | | |
|---|---|---|---|
| 2005/0195867 A1* | 9/2005 | Egawa et al. | 372/33 |
| 2005/0206918 A1* | 9/2005 | Egawa et al. | 358/1.7 |
| 2007/0213864 A1* | 9/2007 | Iijima | 700/121 |
| 2013/0220981 A1 | 8/2013 | Kumaoka et al. | |

FOREIGN PATENT DOCUMENTS

| | | |
|---|---|---|
| GB | 1450908 | 9/1976 |
| JP | 4-259277 | 9/1992 |
| JP | 5-220591 | 8/1993 |
| JP | 10-94887 | 4/1998 |
| JP | 2000-271767 | 10/2000 |
| JP | 2002-299730 | 10/2002 |
| JP | 2005-251855 | 9/2005 |
| TW | 453001 | 9/2001 |

OTHER PUBLICATIONS

"Fanuc Fa America Announces New Laser C Series," Oct. 5, 2010, Fanuc, http://fanucfa.com/eu-pl/broker?uCon=85410654-004e-9b21-c74f-084204c0394c&uBasVariantCon=33333333-3333-3333-3333-333333333333&uTem=69d70560-d9c6-59f0-b529-616b1c08099b&uMen=c8f70560-d9c6-59f0-b529-616b1c08099b&startmon=02&startyear=2015.*

Chinese Office Action, dated May 6, 2014, in counterpart Chinese Application No. 201180044185.0.

Extended European Search Report, dated May 20, 2014, in counterpart European Application No. 11825014.1.

* cited by examiner

LASER MACHINE AND CONTROLLING METHOD OF LASER MACHINE

TECHNICAL FIELD

The present invention relates to a laser machine that can reduce energy consumption during its standby state and a controlling method thereof.

BACKGROUND ART

In a prior art laser machine, it takes a relatively long time to activate and deactivate its laser oscillator. Thus, a laser machine is usually kept in a state where its laser oscillation can be started immediately even at a time when no processing operation is done (standby time) such as an operation break time and an operation preparation time (e.g. Patent Documents 1 and 2 listed below).

PRIOR ART DOCUMENT

Patent Document

Patent Document 1: Japanese Patent Application Laid-Open No. H4-259277
Patent Document 2: Japanese Patent Application Laid-Open No. 2000-271767

SUMMARY OF INVENTION

Problem to be Solved by the Invention

Therefore, even in the standby time, a priming discharge (base discharge) is continued in the laser oscillator, and pressure of laser gas is kept in a high state, by a gas blower, equivalent to a state during an operation time. In addition, even in the standby time, a temperature regulator for cooling the laser oscillator is also operated similarly to a time when a processing operation is done.

As explained above, according to a prior art laser machine, wasteful energies due to continuation of a base discharge during a standby time and so on are consumed, so that improvement is desired.

Therefore, an object of the present invention is to provide a laser machine that can reduce wasteful energy consumption during its standby state and a controlling method thereof.

Means for Solving the Problem

A first aspect of the present invention provides a laser machine that includes a laser oscillator; a cooler for cooling the laser oscillator; and a control unit for controlling the laser oscillator and the cooler, wherein the control unit includes a controller that stops base discharge of the laser oscillator at a time when a specified time has elapsed from a stop of laser light emission by the laser oscillator.

A second aspect of the present invention provides a controlling method of a laser machine that includes a laser oscillator, the method comprising: stopping base discharge of the laser oscillator at a time when a first specified time has elapsed from a stop of laser light emission by the laser oscillator.

According to the above first and second aspects, since base discharge of the laser oscillator is stopped after the specified time (the first specified time) has elapsed from the stop of laser light emission, wasteful energy (power) consumption of the laser oscillator in a standby state can be restricted.

BRIEF DESCRIPTION OF DRAWINGS

FIG. 3 (a) is a diagram corresponding to FIG. 2 showing a standby state in a normal mode, and (b) is a diagram corresponding to FIG. 2 showing a state in an energy-saving mode.

FIG. 4 (a) is a graph showing output change of the laser oscillator in the normal mode, and (b) is a graph showing temperature change of coolant in the normal mode.

FIG. 5 (a) is a graph showing a preset temperature range of the temperature regulator and a temperature change of coolant in an energy-saving mode A, and (b) is a graph showing temperature change of coolant in the normal standby state or in an energy-saving mode B.

DESCRIPTION OF EMBODIMENTS

Hereinafter, a laser machine (and a controlling method thereof) according to an embodiment will be explained with reference to the drawings.

Figure 1:
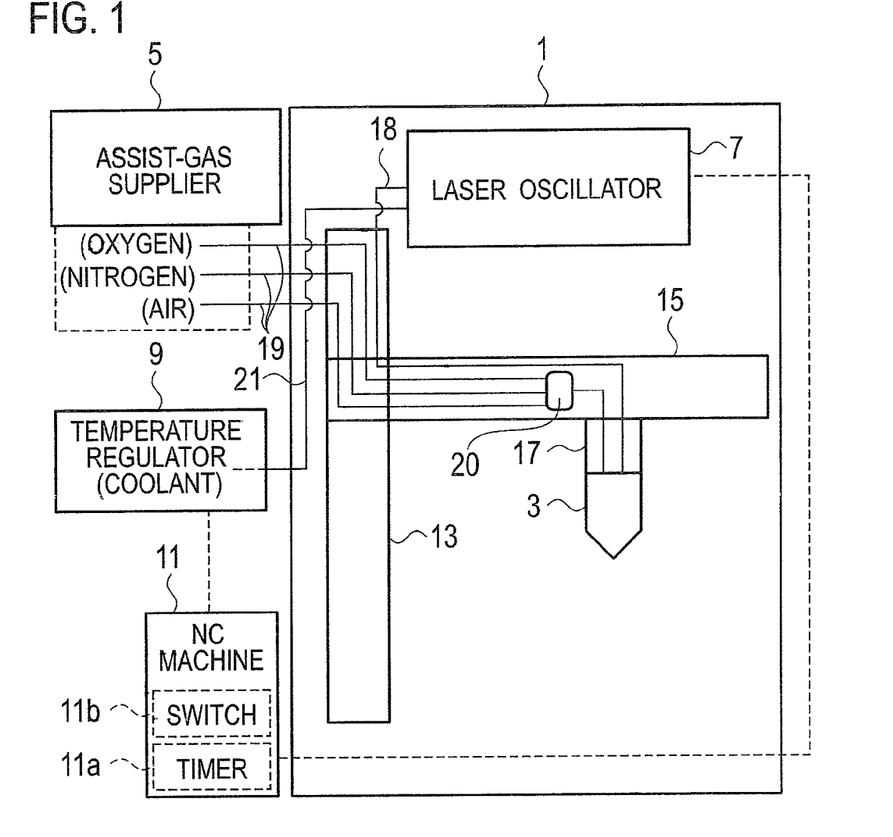
FIG. 1 It is an overall configuration diagram of a laser machine according to an embodiment.

As shown in FIG. 1, the laser machine includes a machine main frame 1, an assist-gas supplier 5, a temperature regulator 9, and an NC (Numerical Control) machine 11. The assist-gas supplier 5 supplies assist-gas (laser-gas) such as nitrogen, oxygen and air to a work head 3 of the machine main frame 1. The temperature regulator 9 cools a laser oscillator of the machine main frame 1. The NC machine 11 also functions as a control unit. In addition, $CO_2$ gas laser is used the laser machine according to the present embodiment, but another type of laser may be also used.

As shown in FIG. 1, the machine main frame 1 includes an X-axis carriage 15 and a Y-axis carriage 17. The X-axis carriage moves relative to a worktable along an X-axis guide 13. The Y-axis carriage 17 moves on the X-axis carriage 15 along a Y-axis direction. In addition, the above-mentioned work head 3 is attached to the Y-axis carriage 17. The work head 3 moves on the Y-axis carriage 17 in a Z-axis direction.

A laser light emitted from the laser oscillator 7 is, for example, transmitted to the work head 3 by an optical fiber(s) through the X-axis guide 13, the X-axis carriage 15 and the Y-axis carriage 17. The assist-gas (laser-gas) from the assist-gas supplier 5 is supplied to the work head 3 by gas pipes 19 and switching valve 20 through the X-axis guide 13, the X-axis carriage 15 and the Y-axis carriage 17. Any of oxygen, nitrogen and air is selectively supplied to the work head 3 as the assist-gas (laser-gas) according to contents of work operations.

The temperature regulator 9 circulates coolant served as a thermo-regulating medium (cooling medium) to the laser oscillator 7 through a coolant pipe 21. The temperature regulator 9 has a compressor (not shown), and the compressor is operated to regulate temperature during a thermo-regulating control for reducing coolant temperature.

Figure 2:
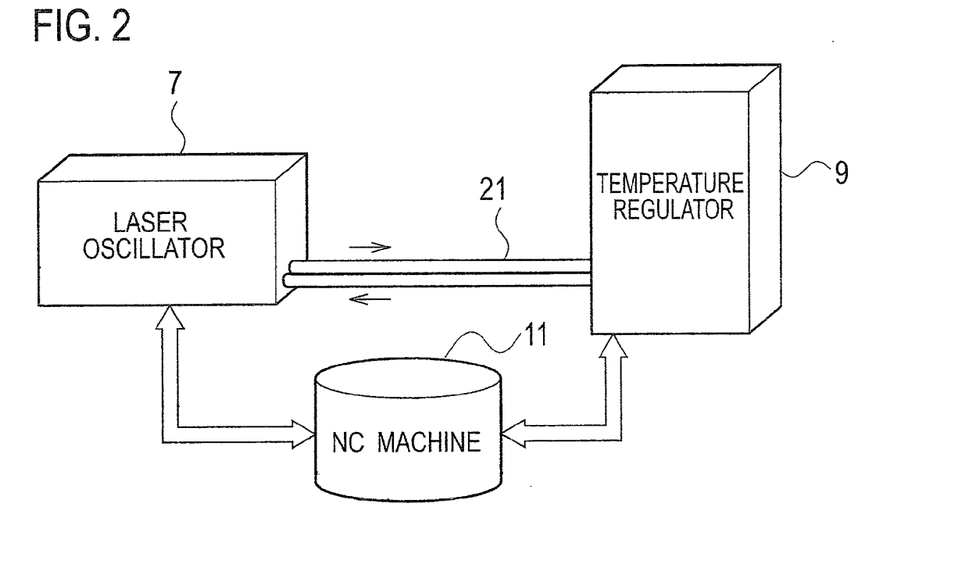
FIG. 2 It is a configuration diagram showing an interrelation among a laser oscillator, a temperature regulator and an NC machine in the laser machine.

The NC machine 11 outputs an activation/stop command and so on to the laser oscillator 7. In addition, the NC machine 11 outputs an operational state of the laser oscillator 7, i.e. an ON/OFF signal indicating an activation/deactivation of the oscillator 7 and so on to the temperature regulator 9. In addition, the laser oscillator 7 outputs a status signal indicating that it is being activated/deactivated to the NC machine 11. Further, the temperature machine 9 outputs an information signal indicating its activation, coolant temperature information and so on to the NC machine 11.

A controller of the NC machine outputs a signal for reducing wasteful energy consumption at a time when no processing operation is done (standby time) such as an operation break time and an operation preparation time. Hereinafter, an operation mode when the signal for reducing wasteful energy consumption is referred as an energy-saving mode. In the present embodiment, two-step energy-saving modes A and B can be set.

Figure 3:
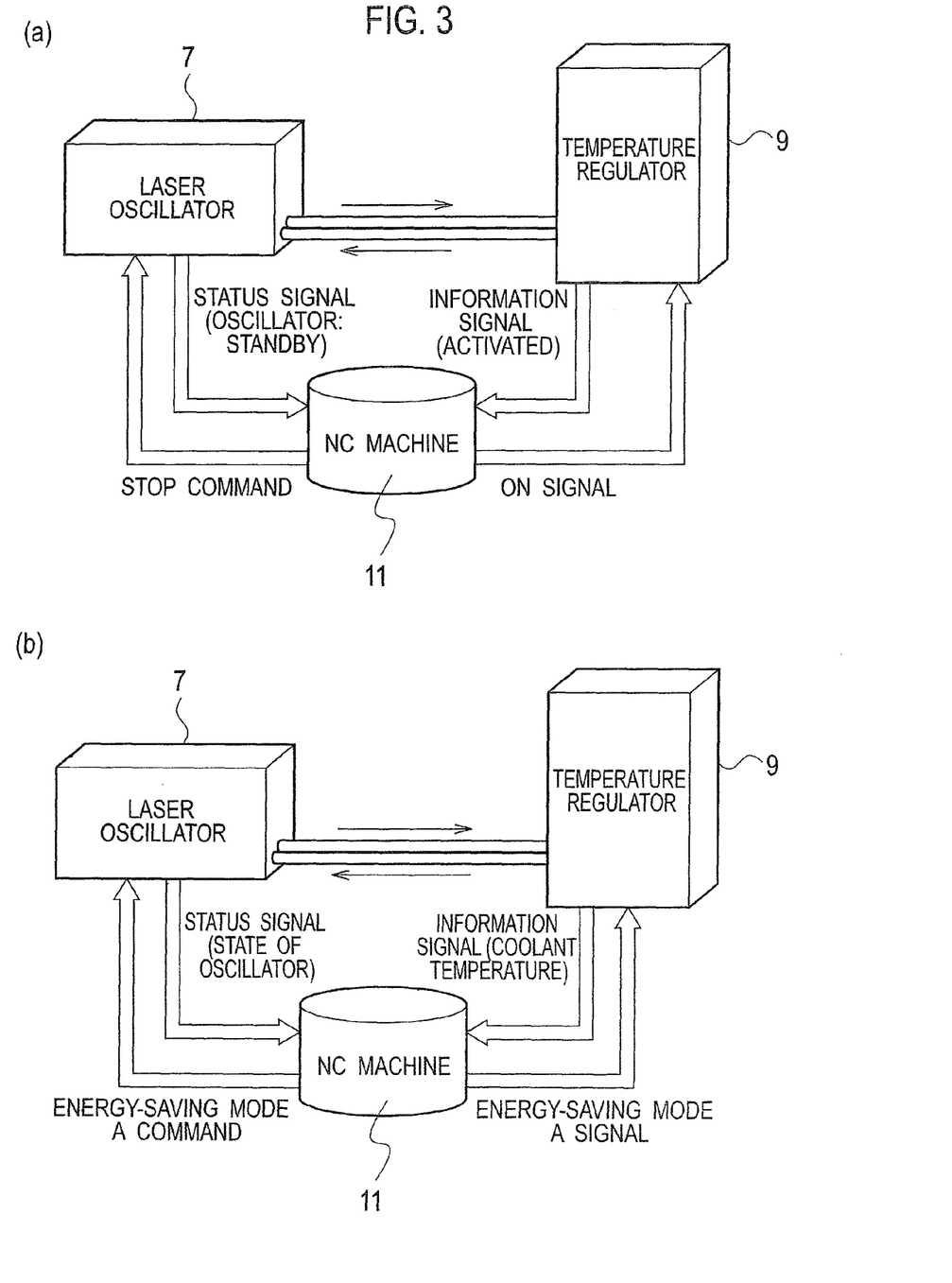

FIG. 3(a) shows a standby state in a normal mode that is not the energy-saving mode, and the coolant is always circulated between the laser oscillator 7 and the temperature regulator 9 similarly to a time when a work operation is being done. Note that the coolant is used for cooling a laser power source, an internal mirror of the oscillator and the laser-gas. The NC machine 11 outputs the stop command for stopping emission of the laser light to the laser oscillator 7, and receives the status signal indicating that oscillation is on standby from the laser oscillator 7.

In the standby state of the normal mode, a base discharge that emits no laser light and needs a lower discharge voltage than that in a time when a processing operation can be done by emitting a laser light. In addition, a blower (not shown) always blows the laser-gas with high pressure similarly to a time when a processing operation can be done.

At this time, the NC machine 11 outputs the ON signal indicating that the laser oscillator 7 is being activated to the temperature regulator 9, and receives the information signal indicating that the temperature regulator is being activated from the temperature regulator 9.

Figure 4:
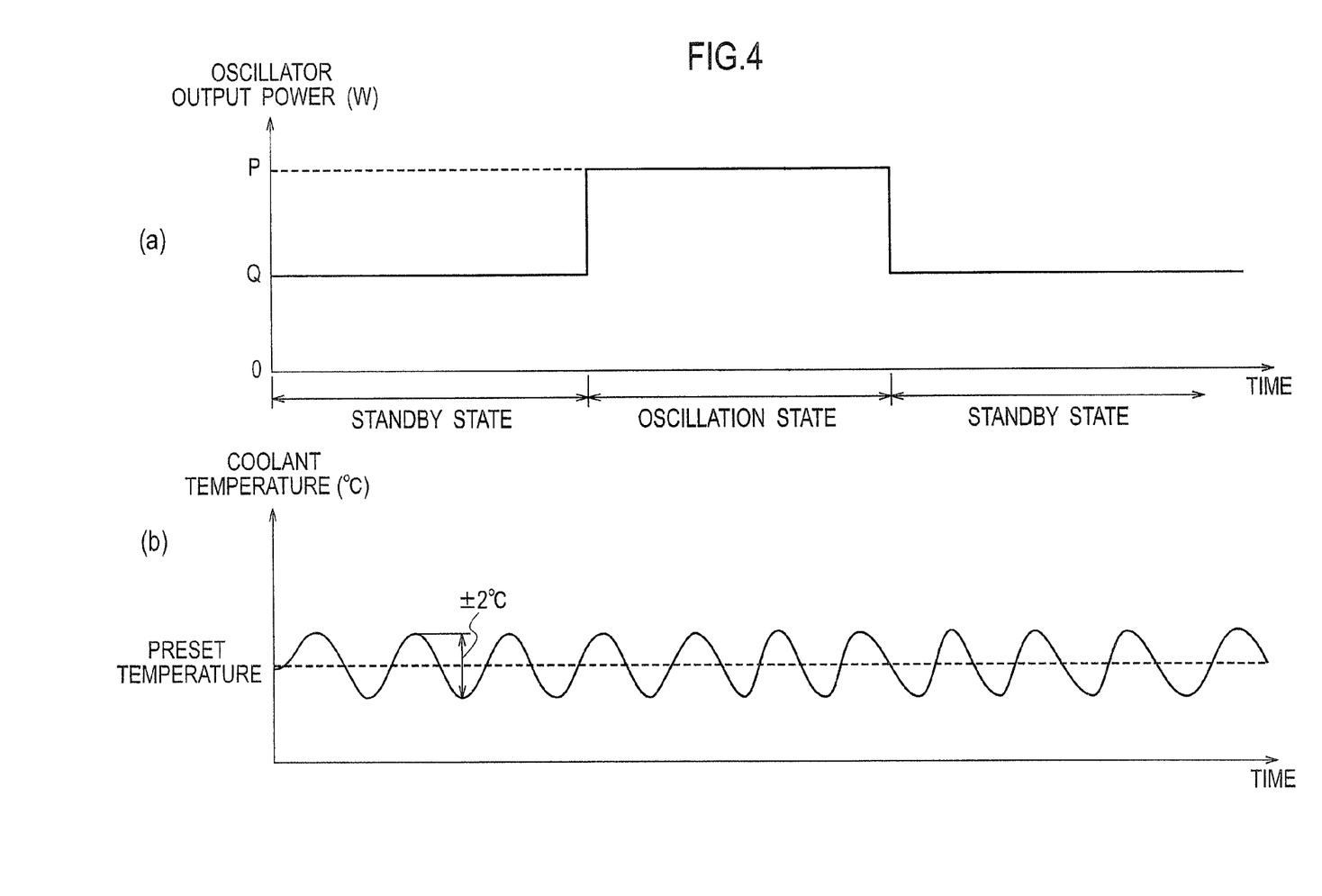

FIG. 4(a) shows an oscillator output power of the laser oscillator 7 in the standby state of the normal mode, and FIG. 4(b) shows a coolant temperature of the temperature regulator 9 in the standby state of the normal mode. According to these graphs, the temperature regulator 9 controls the coolant temperature to be in a range of a preset temperature (e.g. 25° C.) ±2° C. regardless of an oscillation state (laser light emission state) and a standby state (base discharge state with a low discharge voltage) of the laser oscillator 7. This indicates that the coolant temperature is kept almost constant (the preset temperature ±2° C.) by a continuous circulation of the coolant.

FIG. 3(b) shows a state in the energy-saving mode A in contrast to the above-explained standby state in the normal mode shown in FIG. 3(a). The NC machine 11 outputs a command/signal for the energy-saving mode A to the laser oscillator 7 and the temperature regulator 9. At this time, the laser oscillator 7 stops the base discharge and reduces a supply pressure of the laser-gas, and a status signal indicating this state to the NC machine 11. In addition, the temperature regulator 9 outputs an information signal relevant to the coolant temperature to the NC machine 11.

Figure 5:
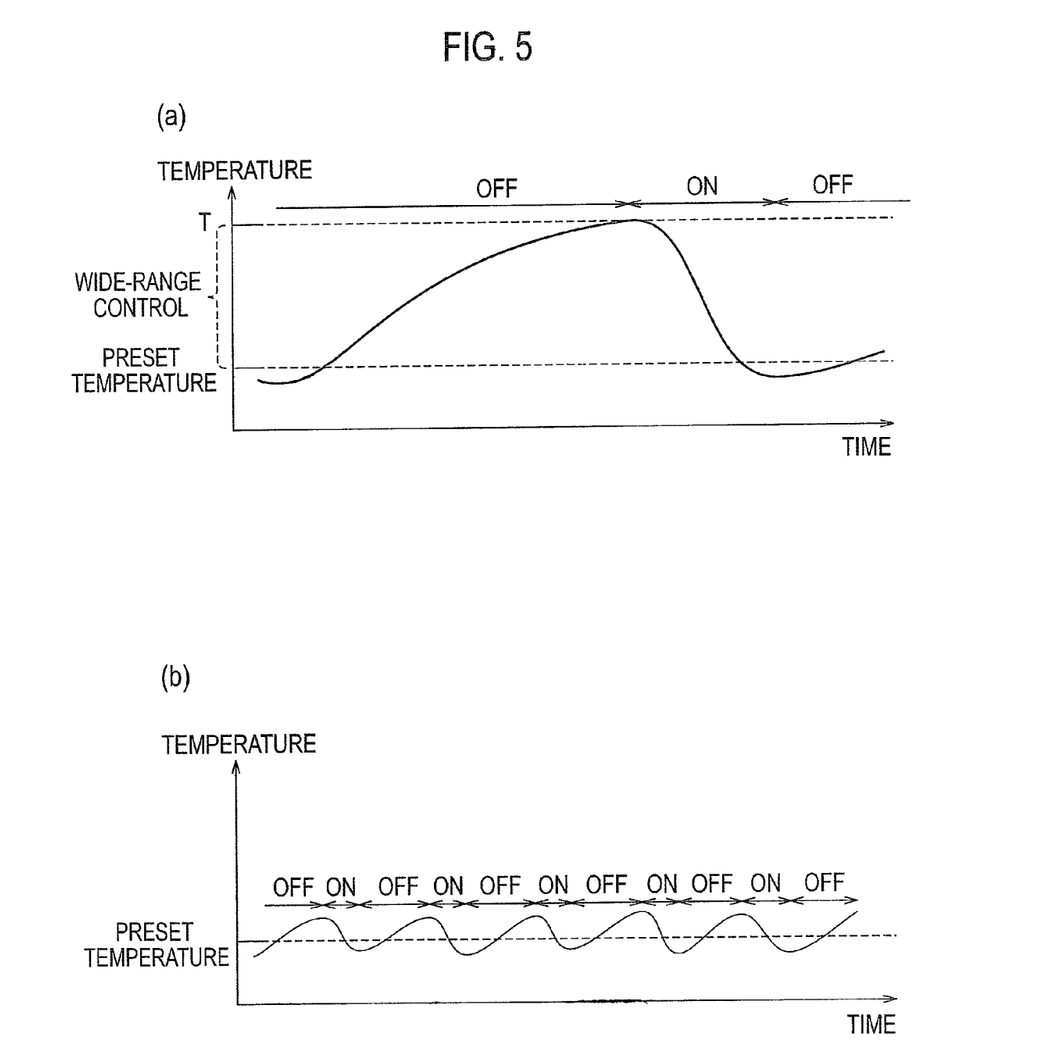

Here in the energy-saving mode A, as shown in FIG. 5(a), the temperature regulator 9 is controlled with a wide-range control in which a temperature control range is expanded. In the wide-range control, au upper limit temperature T is set in addition to the above-explained preset temperature, and a temperature control is carried out with the temperature control range (the preset temperature −2° C. to the upper limit temperature T: e.g. T=+5° C.) wider than the temperature control range (see FIG. 4(b): the preset temperature ±2° C.) in the standby state of the normal mode. Note that "ON" and "OFF" in the FIG. 5(a) indicate a thermo-regulating control status of the temperature regulator 9 (a thermo-regulating operation status of the compressor), and "ON" and "OFF" are repeated alternately.

At this time, the laser oscillator 7 doesn't carry out the base discharge. Therefore, electric power consumption is reduced. In addition, temperature rise of the coolant becomes gradual compared to that in the standby state of the normal mode. Then, the compressor that has been stopped is started to be driven ("OFF" to "ON") for thermo-regulating at a time when the coolant temperature reaches to the upper limit temperature T (or rises over the upper limit temperature T). Since operation/stop frequency of the compressor by the thermo-regulating operation can be decreased by the above-explained wide-range control, electrical power consumption can be reduced.

The coolant temperature may rise in the energy-saving mode A due to the wide-range control and setting of the upper limit temperature T, but heat generation of the laser oscillator 7 reduces. Therefore, by balance (setoff) between these, the laser oscillator 7 can be kept in a thermal range that enables smooth transition to its processing operation using laser light emission.

On the other hand, in the energy-saving mode B, the base discharge of the laser oscillator 7 is stopped similarly to the energy-saving mode A, but a supplied pressure of the laser-gas is kept high similarly to the standby state of the normal mode. In addition, as shown in FIG. 5(b), the coolant temperature is controlled to keep almost constant temperature (the preset temperature ±2° C.) by the temperature regulator 9 similarly to the standby state of the normal mode. Note that horizontal and vertical axes of the graph in FIG. 5(a) showing the energy-saving mode A and those of the graph in FIG. 5(b) showing the energy-saving mode B have an identical scale size, respectively. (However, although showing an identical constant temperature (the preset temperature ±2° C.) control, horizontal and vertical axes of the graph in FIG. 4(b) showing the standby state of the normal mode and those of the graph shown in FIG. 5(b) showing the energy-saving mode B don't have an identical scale size, respectively.) According to comparison between FIG. 5(a) and FIG. 5(b), it is obvious that operation/stop frequency of the compressor is lower in the energy-saving mode A.

Comparison of the normal mode (the standby sate), the energy-saving mode A and the energy-saving mode B as explained above is shown in a following [Table 1].

TABLE 1

|  | NORMAL MODE (STANDBY STATE) | ACTIVATION | DEACTIVATION | ENERGY-SAVING MODE B | ENERGY-SAVING MODE A |
| --- | --- | --- | --- | --- | --- |
| BASE DISCHARGE | ON | OFF | OFF | OFF | OFF |
| LASER-GAS PRESSURE | HIGH | — | — | HIGH | LOW |
| COOLANT TEMP. | PRESET TEMP. | — | — | PRESET TEMP. | WIDE-RANGE |

TABLE 1-continued

|  | NORMAL MODE (STANDBY STATE) | ACTIVATION | DEACTIVATION | ENERGY-SAVING MODE B | ENERGY-SAVING MODE A |
|---|---|---|---|---|---|
| CONTROL | ±2° C. | | | ±2° C. | CONTROL |
| HEATING OF COOLANT | DONE | — | — | UNDONE | UNDONE |
| OSCILLATOR POWER CONSUMPTION | 100 | — | — | 62(-38%) | 29(-71%) |
| TEMP. REGULATOR POWER CONSUMPTION | 100 | 100 | 100 | 100 | 55(-45%) |
| CONSUMED AMOUNT OF LASER-GAS | 100 | 150 | 1400 | 100 | 88(-12%) |
| TRANSITION/RETURN TIME | — | 11 min 30 sec | 4 min | 0.5/5 sec | 20/40 sec |

The power consumptions and the consumed amount in [Table 1] are indicated by relative values to reference values "100" in the standby state of the normal mode, respectively. The power consumption of the laser oscillator 7 in the energy-saving mode B is "62", so it is reduced by 38% relative to the standby state of the normal mode. The power consumption of the laser oscillator 7 in the energy-saving mode A is further reduced to "29", so it is reduced by 71%.

On the other hand, the power consumption of the temperature regulator 9 in the energy-saving mode A in which the wide-range control for the coolant temperature is carried out is "55", so it is reduced by 45%. In addition, the consumed amount of the laser-gas is "88" in the energy-saving mode A due to gas pressure reduction, so it is reduced by 12%. As shown in the [Table 1], the energy-saving mode(s) is effective for reduction of gas consumption amount, because the consumed amount of the laser-gas becomes large when the laser oscillator 7 is activated (powered on) and deactivated (powered off). Note that especially large amount of the gas is needed when the laser oscillator 7 is deactivated, because the gas is removed from the gas pipes once and then fresh gas is supplied again.

The transition/return time will be explained. 11 minutes and 30 seconds at activation is a time while the laser oscillator 7 is activated (powered on) and then reaches an operable state. 4 minutes at deactivation is a time while the laser oscillator 7 is started to be deactivated (powered off) and then the laser oscillator 7 is completely deactivated after the above explained gas replacement (re-activatable state).

In addition, 0.5/5 seconds of the energy-saving mode B are a transition time from the normal mode (the standby state) to the energy-saving mode B and a return time from the energy-saving mode B to the normal mode (the standby state). Similarly, 20/40 seconds of the energy-saving mode A are a transition time from the normal mode (the standby state) to the energy-saving mode A and a return time from the energy-saving mode A to the normal mode (the standby state).

Note that heating of the coolant is a function for keeping its temperature constant by heating the coolant in order to prevent the coolant temperature from being excessively reduced. In the energy-saving mode(s), the heating of the coolant is not done.

Such an operation of the energy-saving mode(s) may be done by using a timer 11a implemented in the NC machine 11 or by using a switch 11b provided on the NC machine 11. By using the switch 11b, a user can start the energy-saving mode(s) arbitrarily, for example, can start the energy-saving mode(s) before the timer 11a starts the energy-saving mode(s).

Figure 6:
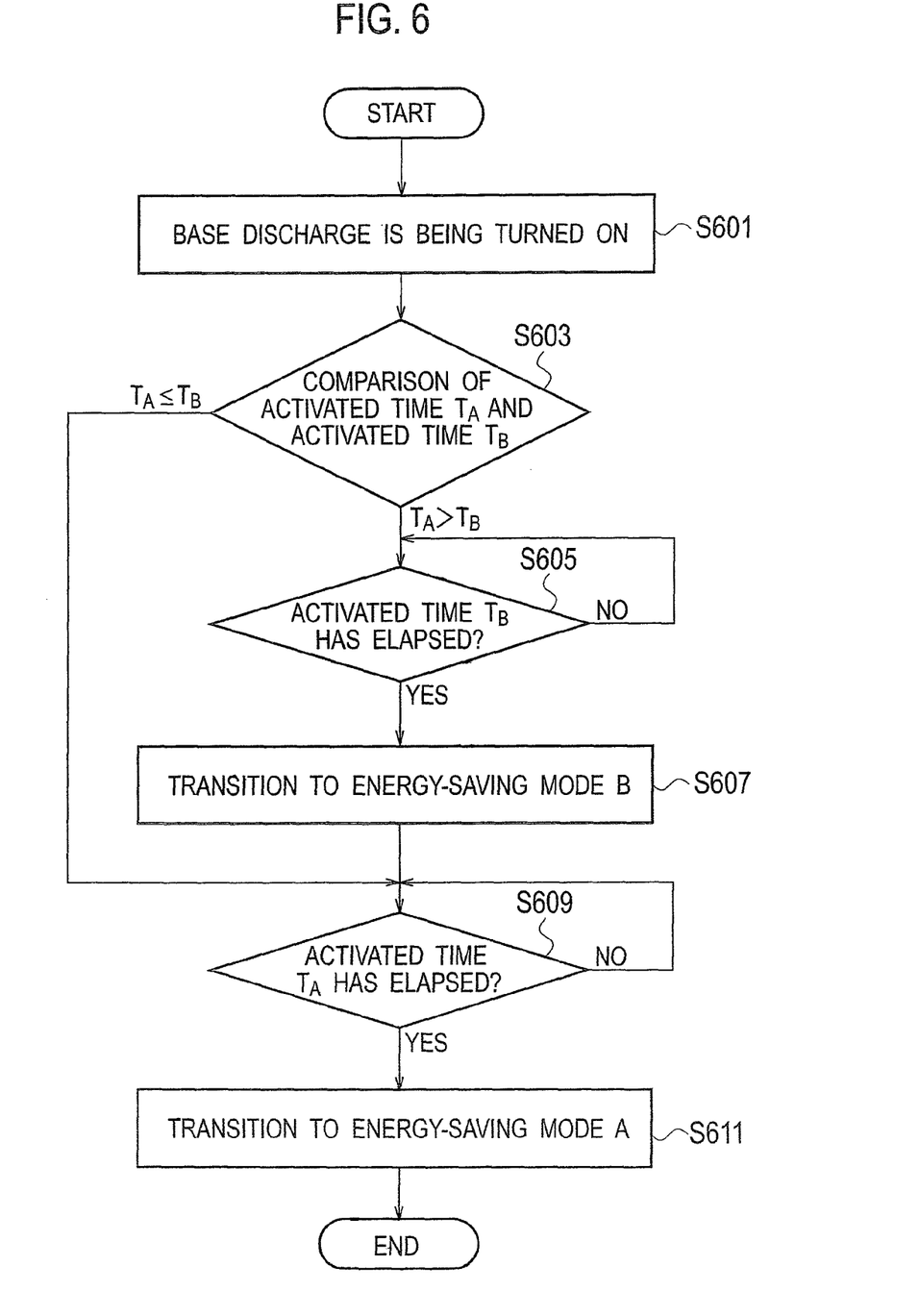
FIG. 6 It is a flowchart showing a start operation of the energy-saving mode when using a timer.

First, transition to the energy-saving mode(s) in which the timer 11a is used will be explained with reference to a flowchart shown in FIG. 6.

In a (ON) state (the standby state of the normal mode) where the base discharge of the laser oscillator 7 is being carried out (step 601), an activated time $T_A$ for the energy-saving mode A and an activated time $T_B$ for the energy-saving mode B are compared with each other (step 603). Here, the activated time(s) can be preset arbitrarily as a time from the standby state of the normal mode where laser light emission is stopped to a start of transition to the energy-saving mode(s), and is different from the transition time (time needed for the transition) shown in [Table 1]. Here, the activated time $T_A$ and the activated time $T_B$ are differentiated from each other, so that it can be made possible to activate the energy-saving mode A or the energy-saving mode B preferentially by using the timer 11a. In the present embodiment, can be adopted a setting where the mode is transferred to the energy-saving mode B when the activated time $T_B$ has elapsed in the standby state of the normal mode and then transferred to the energy-saving mode A when a time $(T_A-T_B)$ has further elapsed $(T_A>T_B)$, or another setting where the mode is transferred to the energy-saving mode A when the activated time $T_A$ has elapsed in the standby state of the normal mode $(T_A \leq T_B)$.

If it is judged that $T_A>T_B$, it is judged whether or not the activated time $T_B$ has elapsed (step 605), and then the mode is transferred to the energy-saving mode B when the activated time $T_B$ has elapsed (step 607). Namely, the laser-gas pressure is kept at a pressure in the standby state of the normal mode, and the base discharge of the laser oscillator 7 is stopped (OFF). In addition, the temperature control range of the coolant is also set to the preset temperature ±2° C. similarly to the standby state of the normal mode. Note that, in this case, the activated time $T_B$ is a specified time (first specified time).

Then, it is judged whether or not the activated time $T_A$ has elapsed (step 609), and then the mode is transferred to the energy-saving mode A when the activated time $T_A$ has elapsed (step 611). Namely, a supplied amount of the laser-gas is reduced by making the laser-gas pressure low, the wide-range control is carried out by expanding the temperature control range. Note that, in this case, the time $(T_A-T_B)$ is a second specified time.

On the other hand, when it is judged that $T_A \leq T_B$ in step 603, the mode is not transferred to the energy-saving mode B. In this case, it is judged whether or not the activated time $T_A$ has elapsed (step 609), and then the mode is transferred to the energy-saving mode A when the activated time $T_A$ has elapsed (step 611). Note that, in this case, the activated time $T_A$ is a specified time (first specified time).

Figure 7:
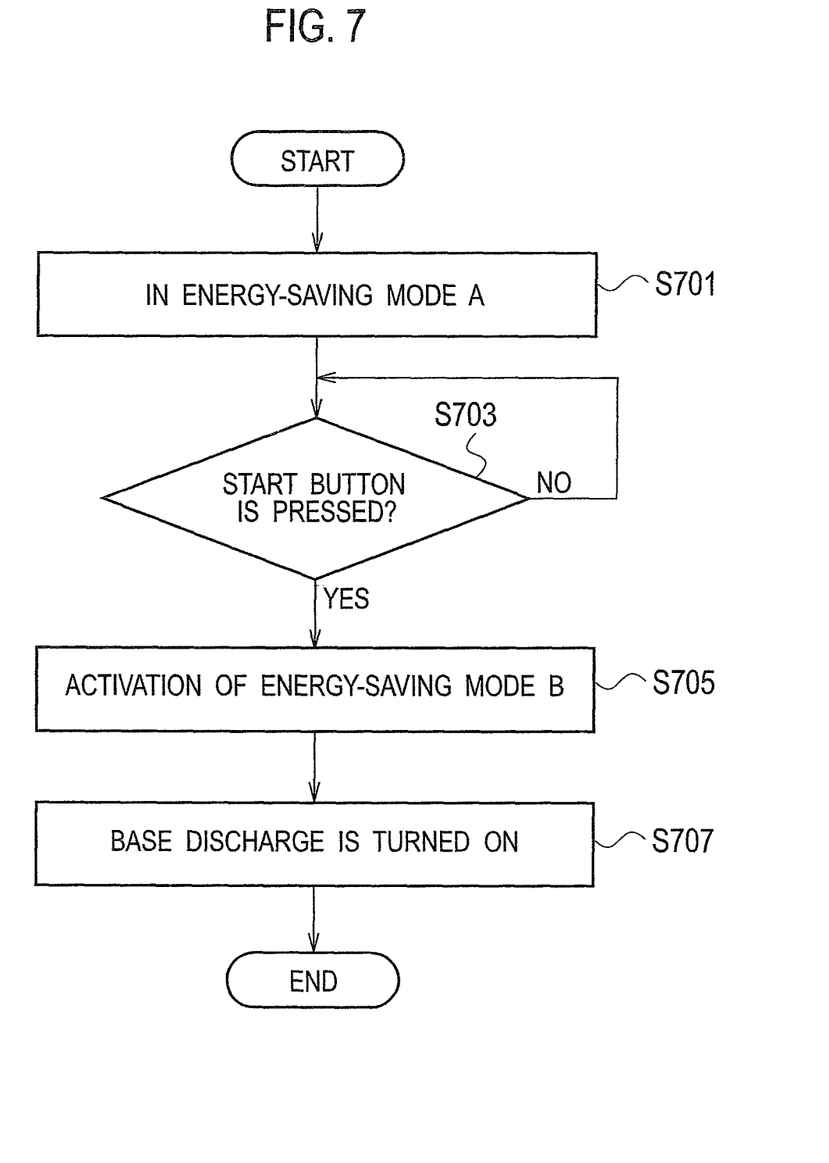
FIG. 7 It is a flowchart showing a termination operation of the energy-saving mode when using the timer.

Next, return from the energy-saving mode A to the standby state of the normal mode in which the timer 11a is used will be explained with reference to a flowchart shown in FIG. 7.

In a state of the energy-saving mode A (step 701), it is judged whether or not a resume button (provided on the NC machine 11: not shown) is pressed (step 703). If the resume button is pressed, the laser-gas pressure is set to a normal pressure and the mode is transferred from the energy-saving mode A to the energy-saving mode B (step 705). Then, the base discharge is started (ON) after the above-explained return time (see [Table 1]: 5 seconds in this case) (step 707), and the mode is resumed to the standby state of the normal mode.

Namely, since the return time from the energy-saving mode A to the standby state of the normal mode is 40 seconds as shown in [Table 1], the transition from the energy-saving mode A to the energy-saving mode B in step 705 takes (40−5)=35 seconds.

Figure 8:
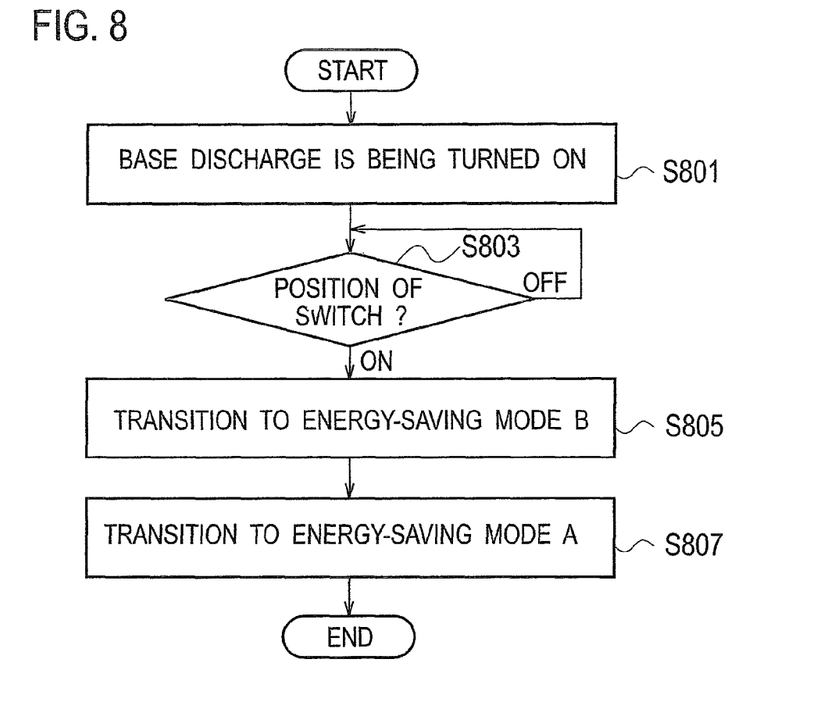
FIG. 8 It is a flowchart showing a start operation of the energy-saving mode when using a switch.

First, transition to the energy-saving mode(s) in which the switch 11b is used will be explained with reference to a flowchart shown in FIG. 8.

In a (ON) state (the standby state of the normal mode) where the base discharge of the laser oscillator 7 is being carried out (step 801), it is judged whether a position of the switch 11b is ON or OFF (step 803). If the switch 11b is positioned at ON, the mode is transferred to the energy-saving mode B (step 805), and then transferred to the energy-saving mode A after a preset time has further elapsed (step 807).

Figure 9:
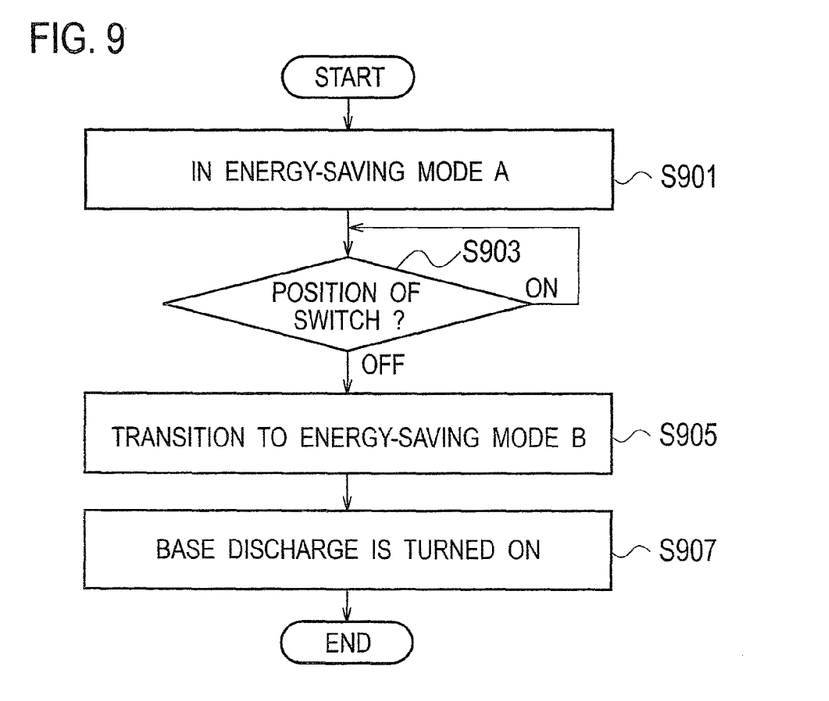
FIG. 9 It is a flowchart showing a termination operation of the energy-saving mode when using the switch.

Next, return from the energy-saving mode A to the standby state of the normal mode in which the timer 11a is used will be explained with reference to a flowchart shown in FIG. 7.

In a state of the energy-saving mode A (step 901), it is judged whether a position of the switch 11b is ON or OFF (step 903). If the switch 11b is positioned at OFF (turned OFF), the laser-gas pressure is set to a normal pressure and the mode is transferred from the energy-saving mode A to the energy-saving mode B (step 905). Then, the base discharge is started (ON) after the above-explained return time (see [Table 1]: 5 seconds in this case) (step 907), and the mode is resumed to the standby state of the normal mode.

As explained above, in any of the case where the timer 11a is used and the case where the switch 11b is used, the mode is resumed by way of the energy-saving mode B in which the laser-gas pressure is set to the normal pressure when resuming from the energy-saving mode A to the standby state of the normal mode. Therefore, since the gas pressure needed for the base discharge in the standby state of the normal mode can be obtained reliably, the return to the standby state of the normal mode can be done smoothly. Note that, of course, the mode may be transferred directly from the energy-saving mode A to the standby state of the normal mode without by way of the energy-saving mode B.

As described above, since the base discharge of the laser oscillator 7 is stopped after the specified time has elapsed from a stop of laser light emission in the present embodiment, wasteful electrical power consumption of the laser machine during its standby state can be restricted.

In addition, the laser-gas pressure supplied to the laser oscillator 7 is reduced after the specified time has elapsed from a stop of laser light emission to reduce a supplied amount of the laser-gas in the present embodiment. Therefore, whole power consumption can be reduced by reducing power consumption of the blower for supplying the laser-gas, and wasteful consumption of the laser-gas can be also reduced.

In addition, the temperature control range of the temperature regulator 9 is expanded after the specified time has elapsed from a stop of laser light emission in the present embodiment. Therefore, power consumption of the temperature regulator can be reduced. Note that the coolant temperature may rise due to the temperature control range is expanded, but heat generation of the laser oscillator 7 reduces. Therefore, by balance (setoff) between these, the laser oscillator 7 can be kept in a thermal range that enables smooth transition to its processing operation using laser light emission.

In the present embodiment, the energy-saving mode(s) can be activated by using the switch 11b provided on the NC machine 11 after a stop of laser light emission. Therefore, the mode can be arbitrarily transferred to the energy-saving mode(s) and thereby convenience can be improved.

Generally, as a method for restricting power consumption in a standby state, there is a method to cut off power to a laser machine. However, in view of the consumed amount of the laser-gas, the consumed amount of the laser-gas can be further restricted by the energy-saving mode A in the standby time under twelve hours, because the laser oscillator consumes large amounts of the laser-gas when its power is turned on/off.

In addition, the power consumptions of the laser oscillator 7 and the temperature regulator 9 constitute equal-to or more-than 90% of the power consumption in the standby. Therefore, the power consumption can be reduced sufficiently by the above-explained energy-saving mode(s).

In the present embodiment, especially in the energy-saving mode A, energy-saving of the laser oscillator 7 can be achieved by stopping the base discharge of the laser oscillator 7 and reducing the laser-gas pressure in the standby state. Here, since heat generation is restricted by the energy-saving of the laser oscillator 7, energy-saving of the temperature regulator can be also achieved.

Since the energy-savings of the laser oscillator 7 and the temperature regulator 9 can be achieved concurrently, internal temperature of the laser oscillator 7 can be kept at temperature that enables smooth resuming while reducing the power consumption.

In addition, the two energy saving modes A and B are prepared and they are changed over in a phased manner, so that energy-saving can be done efficiently.

Note that the mode is transferred from the standby state of the normal mode to the energy-saving mode after the specified time has elapsed from a stop of laser light emission in the above embodiment. A state of the "stop of laser light emission" in this case includes a state after working processes, a temporally-suspended state during working processes that may occurs during processings to a work and so on.

The invention claimed is:

1. A laser machine that operates in one of a standby state of a normal mode, a first energy-saving mode and a second energy-saving mode, in which energy consumption in the first energy-saving mode is lower than energy consumption in the standby state of the normal mode, and energy consumption in the second energy-saving mode is lower than the energy consumption in the first energy-saving mode, the laser machine comprising:
   a laser oscillator;
   a cooler that cools the laser oscillator;
   a controller that controls the laser oscillator and the cooler, to transfer the laser machine among the standby state of the normal mode, the first energy-saving mode and the second energy-saving mode, wherein the controller transfers the laser machine from the standby state of the normal mode to the first energy-saving mode, by stopping a base discharge of the laser oscillator, when a first specified time has elapsed from a stop of laser light emission by the laser oscillator, and wherein the controller transfers from the first energy-saving mode to the second energy-saving mode, by reducing, without eliminating, an amount of laser gas supplied to the laser oscillator, after a second specified time has elapsed from the time when the base discharge of the laser oscillator stops.

2. The laser machine according to claim 1, wherein the controller transfers from the first energy-saving mode to the second energy-saving mode, by expanding a temperature control range of a cooling medium of the cooler, after a second specified time has elapsed from the time when the base discharge of the laser oscillator stops.

3. The laser machine according to claim 1, wherein the controller further expands a temperature control range of a cooling medium of the cooler in the second energy-saving mode.

4. The laser machine according to claim 1, wherein the controller compares the first specified time with a second specified time, which is a time period required to start the second energy-saving mode,
when the first specified time is smaller than the second specified time, the controller transfers from the standby state of the normal mode to the first energy-saving mode.

5. The laser machine according to claim 1, wherein the controller continues to supply laser gas of the reduced supplied amount in the second energy-saving mode.

6. The laser machine according to claim 2, wherein the controller continues to control the cooler in the second energy-saving mode such that the temperature of the cooling medium of the cooler is within the expanded temperature control range, by switching the cooler between ON and OFF.

7. The laser machine according to claim 4, wherein, when the first specified time is equal to or greater than the second specified time, the controller transfers from the standby state of the normal mode to the second energy-saving mode, in which base discharge of the laser oscillator is stopped and the amount of laser gas supplied to the laser oscillator is reduced, after the second specified time has elapsed from the stop of laser light emission by the laser oscillator.

8. The laser machine according to claim 1, wherein in the standby state of the normal mode, the laser oscillator performs base discharge, which emits no laser light and requires a discharge voltage lower than a discharge voltage required in a processing period, in which laser light is emitted and a workpiece is processed, and cooling medium from the cooler and the laser gas are supplied to the laser oscillator in a same condition as in the processing period, and
in the first energy-saving mode, the base discharge is stopped, the cooling medium from the cooler and the laser gas are supplied to the laser oscillator in a same condition as in the standby state of the normal mode.

9. A controlling method of a laser machine that includes a laser oscillator, and operates in one of a standby state of a normal mode, a first energy-saving mode and a second energy-saving mode, in which energy consumption in the first energy-saving mode is lower than energy consumption in the standby state of the normal mode, and energy consumption in the second energy-saving mode is lower than the energy consumption in the first energy-saving mode, the method comprising:
controlling the laser machine to transfer among the standby state of the normal mode, the first energy-saving mode and the second energy-saving mode;
transferring the laser machine from the standby state of the normal mode to the first energy-saving mode by stopping a base discharge of the laser oscillator when a first specified time has elapsed from a stop of laser light emission by the laser oscillator, and transferring from the first energy-saving mode to the second energy-saving mode by reducing, without eliminating, an amount of laser gas supplied to the laser oscillator when a second specified time has elapsed from the stop of the base discharge.

10. The controlling method of a laser machine according to claim 9, wherein the laser machine further includes a cooler that cools the laser oscillator, and
a temperature control range of a cooling medium of the cooler is expanded in the second energy-saving mode.

* * * * *